United States Patent Office 2,752,320
Patented June 26, 1956

2,752,320

POLYESTER COMPOSITIONS

Hobson D. De Witt, Decatur, Ala., assignor to The Chemstrand Corporation, Decatur, Ala., a corporation of Delaware No Drawing. Application December 27, 1954,
Serial No. 477,950

19 Claims. (Cl. 260—33.4)

This invention relates to a new method of preparing synthetic fibers from synthetic linear condensation polyesters. More particularly, the invention relates to a new solvent material for linear polyesters, and to completely miscible mixtures including these polyesters, from which mixtures quality fibers can be extruded.

It is well-known that synthetic linear condensation polyesters derived from dibasic acids and ester-forming derivatives thereof and glycols are capable of being fabricated into many useful objects, including high-strength fibers and extrusion moldings. The conventional technique for preparing fibers and moldings from these polyesters involves spinning, extruding, or otherwise forming the object from the molten polyester. There are certain advantages, however, in the use of solutions rather than molten compositions to achieve the fluid state necessary in lacquers, coating compositions, and dope suitable for use in forming objects such as films, fibers, sheets, ribbons, bristles, and filaments. For example, in coating fabrics, paper, or other materials which are charred or tendered by high temperatures, the use of a solution which can be applied and subsequently evaporated to dryness at a relatively low temperature does not cause deterioration of the material being coated. It is often desirable to prepare a fluid composition for use over a period of time and in that event it is convenient if the composition can be kept in the liquid state by storage at ordinary temperatures. The application of such solutions as lacquers and adhesives is much more easily carried out by methods well-known to the art than the application of a molten composition. Further, the incorporation of plasticizers or other modifying agents in the polyesters can frequently be accomplished more advantageously by addition of the plasticizer to a solution of the polyester rather than to the molten polyester, thus minimizing the tendency toward discoloration and decomposition which frequently occurs when blending is done in the melt. Again, there is a tendency with certain types of plasticizers and modifying agents to be less compatible at the high temperatures required for blending in the melt, whereas they can be readily incorporated in the polyester solution at a low temperature. A still further advantage in the use of solutions lies in the ease with which they can be cast into films or coatings of uniform thickness, which is mechanically more difficult to accomplish with a molten composition due to its relatively high viscosity.

Another important utilization of solutions of synthetic linear condensation polyesters lies in the recovery of waste and scrap material from several sources, e. g., rejects during manufacture, turnings from the machining of solid polyester shapes, skeleton scrap resulting when parts are stamped from polyester strips, trimmings from the cutting of polyester fabric, and used polyester cloth and articles. If this scrap or waste is absolutely clean, it can be remelted under controlled conditions and used over again, but often such material is contaminated with foreign materials such as dirt, oil, grease, or floor sweepings, or it may contain unwanted impurities such as woolen thread, delustrants, etc.

Few solvents for the synthetic linear condensation polyesters as a class have been proposed in the past, and those that have been proposed are impractical due to various disadvantages such as excessive cost, poor color, tendency of the solution to gel upon standing or cooling, etc.

The primary purpose of this invention is the provision of new and useful compositions of matter comprising synthetic linear condensation polyester solutions which are useful in making threads, filaments, bristles, ribbons, coatings, and the like. A further purpose of this invention is to provide a new low-cost solvent for the preparation of synthetic polyester fibers. A further purpose of this invention is to provide a solvent material which forms more stable mixtures or solutions of such polyesters. A still further purpose of the invention is to provide a method of forming fibers of high-tensile strength and desirable elongation.

These and other objects of the invention may be accomplished by dissolving a synthetic linear condensation polyester derived from dibasic acids and a glycol in a solvent selected from the group consisting of molten chloral hydrate, molten mixtures of not less than five percent by weight chloral hydrate and phenol, and solutions of not less than 50 percent by weight chloral hydrate in halogenated lower alkanes containing at least four halogen atoms per molecule.

The temperature to which it is necessary to heat a mixture of a polyester and one of the above-named solvents in order to effect solution will, of course, depend upon the composition of the solvent and the polyester employed. When chloral hydrate alone is employed as a solvent medium, any temperature above which the chloral hydrate is molten and below its boiling point will be found suitable for solution of any of the polyesters. Solution can be effected more rapidly at temperatures nearer the boil of the chloral hydrate than at those nearer its melting point. In general, I have found it preferable when employing molten chloral hydrate as a solvent to dissolve the polyesters at temperatures ranging up from about 60 to about 95° C. When molten mixtures of chloral hydrate and phenol are used as the solvent medium for the polyesters, temperatures of from about 50° C. up to the boiling point of the mixture are suitable. When solutions of chloral hydrate in a halogenated lower alkane containing at least four halogen atoms per molecule are employed as a solvent medium temperatures of from about 50° C. up to the boiling point of the solution employed are suitable for dissolving the polyesters.

Solutions of not less than 50 percent by weight chloral hydrate in any of the halogenated lower alkanes containing at least four halogen atoms per molecule are suitable as solvent mediums for polyesters. Examples of suitable halogenated lower alkanes include: tetrachloromethane, tetrabromomethane, dibromodichloromethane, tetrachloroethane, tetrabromoethane, dibromodichloroethane, pentachloroethane, hexachloroethane, tetrachloropropane, tetrabromopropane, pentachloropropane, pentabromopropane, hexachloropropane, hexabromopropane, tetrachlorobutane, tetrabromobutane, pentachlorobutane, pentabromobutane, hexachlorobutane, hexabromobutane, octachlorobutane, octabromobutane, etc.

While each polymer will vary somewhat in its solubility characteristics and temperature of solvation, this invention is applicable to all simple linear condensation polyesters which are derived from dibasic acids, both aliphatic and aromatic, and ester-forming derivatives thereof, and a glycol in which the terminal hydroxy groups are separated by from two to ten methylene groups inclusive. The polyesters with which this invention is concerned may be derived from aliphatic dibasic acids such as oxalic, adipic, pimelic, suberic, azelaic, sebacic, succinic, malonic, brassylic, thapsic, japanic, glutaric, methylsuccinic, methylmalonic, etc. Those polyesters most suitable for spinning into fibers are derived from the aromatic dibasic acids or their ester-forming derivatives such as orthophthalic, isophthalic, terephthalic, homophthalic, 4,4' - diphenyldicarboxylic, p,p'- dicarboxydiphenyl sulfone, p,p'-dicarbomethoxydiphenyl sulfone, napthalene-1,5-dicarboxylic, p-carboxyphenoxyacetic, p-carboxyphenoxypropionic, p-carboxyphenoxybutyric, p,p'-dicarboxydiphenyl ether, etc.

The polyesters with which this invention is concerned are derived from any of the above-described dibasic acids when polymerized with a glycol in which the terminal hydroxy groups are separated by from two to ten methylene groups inclusive, such as ethylene glycol, trimethylene glycol, tetramethylene glycol, pentamethylene glycol, hexamethylene glycol, heptamethylene glycol, octamethylene glycol, nonamethylene glycol, and decamethylene glycol.

These same solvents consisting of molten chloral hydrate, molten mixtures of chloral hydrate and phenol, and solutions of chloral hydrate in halogenated lower alkanes are also particularly useful as solvents for linear condensation polyesters derived from two or more different dibasic acids and a glycol. Copolyesters derived from two different aliphatic dibasic acids, two different aromatic dibasic acids, or an aliphatic and an aromatic dibasic acid are soluble in the solvents. In short, the above-described solvents may be employed to produce solutions of any of the synthetic linear condensation polyester compositions generally extruded and molded from the melt. Moreover, by the use of these solvents clear, viscous solutions are obtained suitable for extrusion into non-solvent coagulating baths to yield fibers and films.

The following examples in which parts, proportions, and percentages are by weight illustrate further the applications of the principles of the invention.

*Example I*

There was melted by gentle heating seven parts of chloral hydrate. When the chloral hydrate was molten, there was added thereto one part of polyethylene terephthalate and the mixture heated to 90° C. with stirring. At this temperature solution of the polyester was complete in 15 minutes, and the solution became clear. This solution was suitable for extruding into a non-solvent coagulating bath, such as water, lower alcohols, dioxane, etc. to yield tough, pliable fibers, or for casting into films.

*Example II*

To five parts of phenol there was added five parts of chloral hydrate and the mixture heated and stirred until molten. To the resulting solution there was then added two parts of polyethylene terephthalate and the solution heated to 80° C. At this temperature solution of the polymer was complete in less than five minutes and the solution became clear. Upon cooling to room temperature this solution showed no evidence of gel formation and no precipitation of the polyester. This solution was suitable for extrusion into a non-solvent coagulating bath to yield fibers, or for casting films.

*Example III*

To five parts of dibromodichloromethane there was added six parts of chloral hydrate and the mixture stirred to effect solution. To this solution there was then added one part of polyethylene terephthalate and the solution heated to 80° C. At this temperature solution of the polyester was complete in from 15 to 20 minutes and the solution became clear. This solution was suitable for extruding into a non-solvent coagulating bath to yield fibers, or for casting films.

*Example IV*

There was melted by gentle heating 12 grams of chloral hydrate. When the chloral hydrate was molten, there was added thereto three grams of a polyester composed of polyethylene terephthalate containing 3.0 mole percent of p,p'-dicarboxymethoxydiphenyl sulfone and the mixture heated to 80° C. with stirring. At this temperature solution of the polyester was complete in 10 minutes, giving a clear solution. This solution was suitable for extruding into a non-solvent coagulating bath to yield fibers, or for casting films.

In the foregoing examples the invention has been illustrated with particular reference to solutions of polyethylene terephthalate, but it is to be understood that the invention is not limited to this particular polyester but rather to the synthetic linear condensation polyesters as a class. Any of the polyesters described above in this specification can be substituted for the polyethylene terephthalate with only minor changes in proportions and temperatures being required.

While these solutions are generally prepared by heating on a bath, other suitable means may be used. Stirring of the mixture during the heating process is advantageous but is not always necessary.

The properties of the objects formed from the compositions herein described may be modified by appropriate modification of the composition. Thus, the compositions of this invention may have incorporated therein various modifying agents, such as plasticizers, dyes, pigments, diluents, resins, cellulose derivatives, waxes, water repellents, luster modifying agents, flame repellents, and the like. Solutions of different polyesters or the polyester with other polymers or solutes can be solution blended and precipitated to give homogeneous blends, where melt blending is undesirable or impractical.

Fibers and filaments can be prepared by either dry-spinning or wet-spinning into suitable coagulating baths. Filaments obtained by these methods have a rougher surface and a more porous structure than those obtained by melt spinning. Staple fibers made by cutting these filaments, therefore, can be spun into yarns more readily than staple fibers made from melt spun filaments.

Although specific reference has been made to the use of solutions for the formation of films and filaments, the invention is not restricted thereto, since the solutions are useful for forming a variety of objects irrespective of the shape of the object. Typical objects which can be formed from the solution are bristles, ribbons, sheets, and plasticized or otherwise modified solid compositions useful for making molded articles. The solutions are also useful for application as lacquers on wood, metal, glass, and other surfaces, for coating wire, fabrics, paper, regenerated cellulose, and the like, and for impregnating fabric, paper and other porous material.

As many widely different embodiments of this invention may be made without departing from the spirit and scope thereof, it is to be understood that the invention is not limited to the specific embodiments thereof except as defined in the appended claims.

I claim:

1. A new composition of matter comprising a homogeneous miscible mixture of a solvent selected from the group consisting of molten chloral hydrate, molten mixtures of not less than five percent by weight chloral hydrate and phenol, and solutions of not less than 50 percent by weight chloral hydrate in halogenated alkanes of one to four carbon atoms containing at least four halogen atoms per molecule, and a synthetic linear condensation polyester of a dicarboxylic acid and a glycol in which the terminal hydroxy groups are separated by from two to ten methylene groups inclusive.

2. A composition of matter as defined in claim 1 wherein the solvent is molten chloral hydrate.

3. A composition of matter as defined in claim 1 wherein the solvent is a solution of not less than five percent chloral hydrate in phenol.

4. A composition of matter as defined in claim 1 wherein the solvent is a solution of not less than 50 percent chloral hydrate in tetrachloromethane.

5. A composition of matter as defined in claim 1 wherein the solvent is a solution of not less than 50 percent chloral hydrate in dibromo dichloromethane.

6. A composition of matter as defined in claim 1 wherein the dicarboxylic acid is terephthalic acid.

7. A composition of matter as defined in claim 1 wherein the dicarboxylic acid is isophthalic acid.

8. A composition of matter as defined in claim 1 wherein the dicarboxylic acid is 4,4'-diphenyldicarboxylic acid.

9. A composition of matter as defined in claim 1 wherein the dicarboxylic acid is succinic acid.

10. A composition of matter as defined in claim 1 wherein the dicarboxylic acid is adipic acid.

11. A composition of matter as defined in claim 1 wherein the glycol is ethylene glycol.

12. A composition of matter as defined in claim 1 wherein the glycol is trimethylene glycol.

13. A composition of matter as defined in claim 1 wherein the glycol is tetramethylene glycol.

14. A composition of matter as defined in claim 1 wherein the glycol is pentamethylene glycol.

15. A composition of matter as defined in claim 1 wherein the glycol is hexamethylene glycol.

16. A process of preparing a fiber-forming solution comprising mixing a synthetic linear condensation polyester of a dicarboxylic acid and a glycol in which the terminal hydroxy groups are separated by from two to ten methylene groups inclusive, with a solvent selected from the group consisting of molten chloral hydrate, molten mixtures of not less than five percent chloral hydrate and phenol, and solutions of not less than 50 percent by weight chloral hydrate in a halogenated alkane of one to four carbon atoms containing at least four halogen atoms per molecule, and heated to a temperature from about 60 to 95° C. until the polyester is dissolved therein.

17. A process as defined in claim 16 wherein the solvent is molten chloral hydrate.

18. A process as defined in claim 16 wherein the solvent is a molten mixture of not less than five percent by weight chloral hydrate and phenol.

19. A process as defined in claim 16 wherein the solvent is a solution of not less than 50 percent by weight chloral hydrate in a halogenated alkane of one to four carbon atoms containing at least four halogen atoms per molecule.

References Cited in the file of this patent
FOREIGN PATENTS 609,947   Great Britain _____ Oct. 8, 1948